US006036795A

United States Patent [19]

Sauron et al.

[11] Patent Number: 6,036,795

[45] Date of Patent: Mar. 14, 2000

[54] BUTT-WELDING PROCESS USING AN AUTOMATICALLY CONTROLLED ELECTRO-WELDING MACHINE

[75] Inventors: Jean Sauron, Draveil; Gil Gaunt, Saint-Fargeau Ponthierry; Jean-Claude Huguey, Ormesson, all of France

[73] Assignees: Gaz de France (G.D.F.) Service National, Paris; Societe Joseph Sauron Material Industriel, Bondoufle, both of France

[21] Appl. No.: 09/062,725

[22] Filed: Apr. 20, 1998

[30] Foreign Application Priority Data

Apr. 23, 1997 [FR] France .................................. 97-05026

[51] Int. Cl.[7] ............................ B29C 65/02; H05B 1/02; B32B 31/00

[52] U.S. Cl. .................... 156/64; 156/304.2; 156/304.6; 156/358; 156/359; 219/494

[58] Field of Search .................................... 156/358, 359, 156/64, 157, 158, 304.2, 304.6, 499; 219/494

[56] References Cited

U.S. PATENT DOCUMENTS

| | | | |
|---|---|---|---|
| 4,640,732 | 2/1987 | Stafford | 156/358 |
| 4,837,424 | 6/1989 | Nussbaum et al. . | |
| 4,957,570 | 9/1990 | Jenkins et al. | 156/64 |
| 5,013,376 | 5/1991 | McElroy, II et al. . | |
| 5,072,097 | 12/1991 | Miller . | |
| 5,130,518 | 7/1992 | Merle . | |
| 5,620,625 | 4/1997 | Sauron et al. . | |

FOREIGN PATENT DOCUMENTS

| | | |
|---|---|---|
| 2572326 | 5/1986 | France . |
| 2191976 | 12/1987 | United Kingdom . |
| WO9209419 | 6/1992 | WIPO . |
| WO9324301 | 12/1993 | WIPO . |
| WO9511124 | 4/1995 | WIPO . |

*Primary Examiner*—Richard Crispino
*Assistant Examiner*—Sue A. Purvis
*Attorney, Agent, or Firm*—Rothwell, Figg, Ernst & Kurz, P.C.

[57] ABSTRACT

It concerns butt-welding of parts made of plastics material (s). For this purpose, the invention proposes correcting, according to an ambient temperature which is measured in the environment of the parts at the moment of welding, at least one of the following parameters: pressure(s) for contact and/or welding of the parts, electrical energy to be supplied to means for displacement of the said parts, stroke(s) of relative displacement of the parts, time for obtaining beads at the end of the parts during the phase of heating the latter.

14 Claims, 5 Drawing Sheets

FIG_1

| MANUFACTURER | | | | TYPE | | DIAMETER | | | BATCH NUMBER | | | | | | SDR |
|---|---|---|---|---|---|---|---|---|---|---|---|---|---|---|---|
| A | | B | | | | | | | | | | | | | |
| 1 | 2 | 3 | 4 | 5 | 6 | 7 | 8 | 9 | 10 | 11 | 12 | 13 | 14 | 15 | 16 |
| 5 | 6 | 2 | 6 | 0 | 1 | 2 | 2 | 4 | 9 | 5 | 0 | 0 | 0 | 1 | 7 |

| MATERIAL | | | | | COMPATI-BILITY WITH A | | BATCH NUMBER FOR MATERIAL | | | | | | | | CONTROL |
|---|---|---|---|---|---|---|---|---|---|---|---|---|---|---|---|
| | | | MRS | MFI | MRS | MFI | | | | | K | LENGTH | | | |
| 17 | 18 | 19 | 20 | 21 | 22 | 23 | 24 | 25 | 26 | 27 | 28 | 29 | 30 | 31 | 32 |
| 0 | 2 | 1 | 1 | 3 | 2 | 1 | 1 | 2 | 3 | 4 | 1 | 0 | 1 | 2 | |

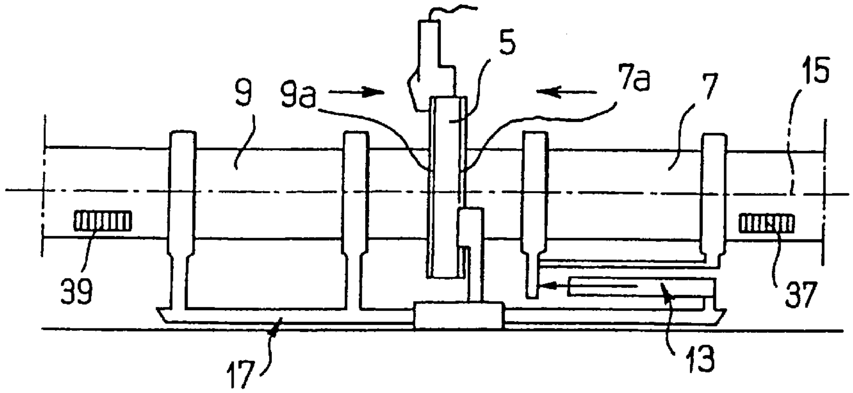
FIG_3
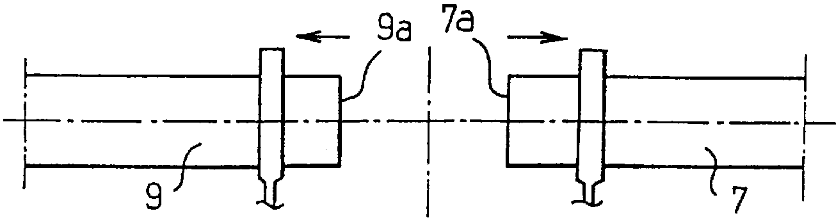
FIG_4
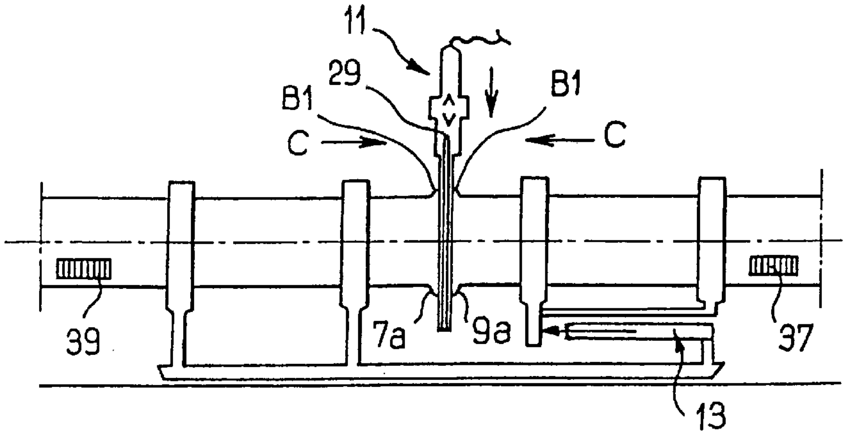
FIG_5
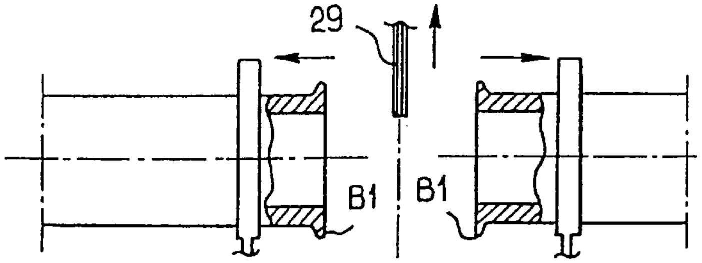
FIG_6
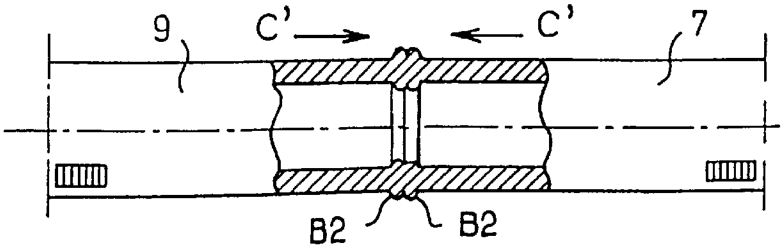
FIG_7

BUTT-WELDING PROCESS USING AN AUTOMATICALLY CONTROLLED ELECTRO-WELDING MACHINE

FIELD OF THE INVENTION

The invention concerns a process and an automatic welding apparatus, for automatically butt-welding parts made of plastics material(s), such as tubes.

DESCRIPTION OF THE BACKGROUND ART

In order to connect together, substantially coaxially, thermoplastic tubular parts, for example made of polyethylene, a process has already been proposed for welding these tubes, by butting, according to a preset procedure.

It will be recalled that butt-welding of parts does not require any intermediate connecting sleeve (often termed "fitting"), nor a heating resistance arranged in or on the parts to be welded, while in a technique of electrofusion with "fitting", a coiled electrical wire is customarily embedded in the connection (see U.S. Pat. No. 5,130,518 regarding this).

Within the specific framework of butt-welding, and in particular in patents EP-A-0 643 642 or U.S. Pat. No. 5,620,625, it is known in particular:

to arrange the parts with their ends to be welded face to face, to heat the ends of the parts by way of a heating element, then to allow the heating produced to diffuse internally therein for a total heating time t1 then of internal heating t2, under a pressure P1, P'1 during the heating time and a pressure P2, P'2 during the internal heating time, in order there to obtain beads of material B1, following a substantially coaxial stroke of relative displacement of the parts (C) by way of displacement means, then, on expiry of a transition time interval t3, to apply the said ends of the parts to one another, by their beads of material, following another relative stroke (C') by way of the said displacement means), for a duration t4 necessary to establish a welding pressure P5, P'5 followed by a time t5 for substantial maintaining of the said welding pressure (normally with deformation then of the said beads; B2), after which, the weld obtained is maintained substantially without manipulation for a cooling time interval t6.

In the two above-mentioned documents, provision is moreover made to adapt the time, by lengthening or shortening it, according to an ambient temperature measured in the environment of the parts, during the course of the welding process.

More precisely, provision is made for:

heating the ends to be welded of the parts by means of a heating element currently termed a "mirror", supplying electrical energy to the heating element, so as to be able to meet the criteria for heating the said ends of the parts, additionally providing means for measuring the temperature of the said parts at the start of welding (ambient temperature), the temperature measured being then transmitted to means for implementing the welding programme, in order to adapt the duration of the electrical current applied to the heating element, according to the ambient temperature measured.

SUMMARY OF THE INVENTION

Taking this ambient temperature into account may effectively be regarded as an important characteristic for butt-welding plastics parts.

An object of the invention, according to a first characteristic, is to optimise the use of this ambient temperature datum and, more generally, to improve the operating conditions for welding, in such a way as to render the latter more reliable and improve performance with regard to the quality of the weld, while providing a machine design which is as uncomplicated as possible, having regard to cost and ease of manufacture and use.

It is under these conditions that a first characteristic of the invention, within the framework of the welding process detailed above, provides for the adaptation or correction, according to the said ambient temperature which will have been measured at the moment of welding, of at least one of the following parameters:

pressure(s) P1, P'1, and/or P2, P'2, and/or P5, P'5, electrical energy to be supplied to the said means for displacement of the parts (voltage, current intensity . . . ), stroke(s) of relative displacement of the parts, C and/or C', Time taken to obtain the beads (B1) during the phase of heating the parts in contact with the heating element (t1, t2) and/or t3 (transition time) and/or t4 (time required to reach the welding pressure) and/or t5 (time for which this welding pressure is maintained).

For the purpose of simplification of the electronic means which will control these influences of the ambient temperature, and of effectiveness of the condition that should result therefrom, without sacrificing any of the reliability of the process, a complementary characteristic provides that preferably the "time" parameter will be used, and more precisely only the heating time t1 and/or the internal heating time t2.

This being stated, another consideration of the invention concerns the manner in which this adaptation of time, pressure or stroke is carried out according to the ambient temperature.

For this purpose, two possible methods have been used.

According to the first method:

the ambient temperature is measured by means of a temperature probe, corresponding temperature readings are supplied to a processing unit of a control box which determines the adapted value of the time, electrical energy, pressure and/or stroke in question, according to a correction algorithm previously entered in an internal memory of the box, to a correction coefficient also previously entered in the internal memory of the said box, and to a nominal reference or desired time, pressure, electrical energy and/or stroke(s).

According to a second method:

the ambient temperature is still measured by means of a temperature probe or equivalent, the (each) part to be welded is equipped with an external support designed to contain data concerning the welding of the said parts and capable of being read by reading means suitable for transmitting these data to the processing unit of a control box, the ambient temperature readings of the probe and the said data read on the (each) support are fed to the said processing unit which determines the adapted value of the time, pressure, electrical energy, (U, I, . . . ) and/or the stroke in question, still according to a correction algorithm, a correction coefficient and a nominal reference or desired time, pressure, electrical energy and/or stroke.

According to another characteristic, the nominal datum of pressure, stroke, electrical energy and/or reference time may quite particularly depend on the welding rule to be observed ("standard"), on the plastics material in question and on the frontal dimension of the parts facing one another, this dimension being able to be determined from data of diameter (assuming that the parts are circular) and/or of thickness, and advantageously entered in the external support associated with the parts (bar code for example), like the material data; the data linked to the welding rule to be observed will, on the other hand, preferably be entered in the internal memory of the control box.

Another consideration of the invention is additionally aimed at optimising the monitoring of the requirements to be met with regard to an imposed welding rule, such as a standard.

For that, a characteristic of the invention provides for meeting values in particular of pressure in the area of welding of the parts and/or bead values in this area and/or time values, such as are required by the said welding rule to be observed, by using monitoring of the stroke of relative displacement of the said parts, by comparison between a pre-set reference stroke and an actual stroke measured during the course of the welding operations.

According to a complementary characteristic of the invention, provision has also been made, in order to preset the said reference stroke, for the possibility of recording, on a memory support, data relating to the evolution over time of the displacement of the said parts during at least a part of the welding procedure, according to data relating to the evolution over time of the parameter "pressure" in the area of welding of the parts as required according to the said welding rule to be observed.

In this case, the evolution over time of the "pressure" parameter will therefore have been translated by a nomogram, or equivalent, corresponding to the evolution of the parameter "relative displacement of the parts", over the same time, this "replacement nomogram" preferably having been entered in the internal memory of the control box.

In order to obtain the best advantage from this correlation envisaged between the "pressure" parameter and the parameter "relative displacement of the parts (stroke)", it is possible, as desired, either to substitute for the monitoring of the pressure the monitoring of the relative displacement of the parts, or simultaneously monitor both: pressure and stroke.

If it is desired further to refine the monitoring of the stroke, the invention proposes to correct the relative displacement monitored over time of the said parts according to the ambient temperature which has been measured, thus making it possible to increase further the reliability and the certainty of obtaining a high quality weld.

BRIEF DESCRIPTION OF THE DRAWINGS

In addition to the process which has just been described, the invention also concerns a welding apparatus, the characteristics of which can permit the implementation of this process, and the details of which will be revealed in the description which follows, provided with reference to the accompanying drawings, in which:

FIG. 2 shows an identification support (in the present case a bar code) to be attached to a tube, FIGS. 3, 4, 5, 6 and 7 illustrate diagrammatically five successive stages of a butt-welding procedure.

DETAILED DESCRIPTION OF THE PREFERRED EMBODIMENTS

In the following, in relation to the figures, there will essentially be dealt with the case where the ambient temperature measured has in particular an influence on the time taken for creation of the material beads, by way of a correction coefficient constituting one of the "digits" of the information supports associated with the parts to be welded.

Figure 1:
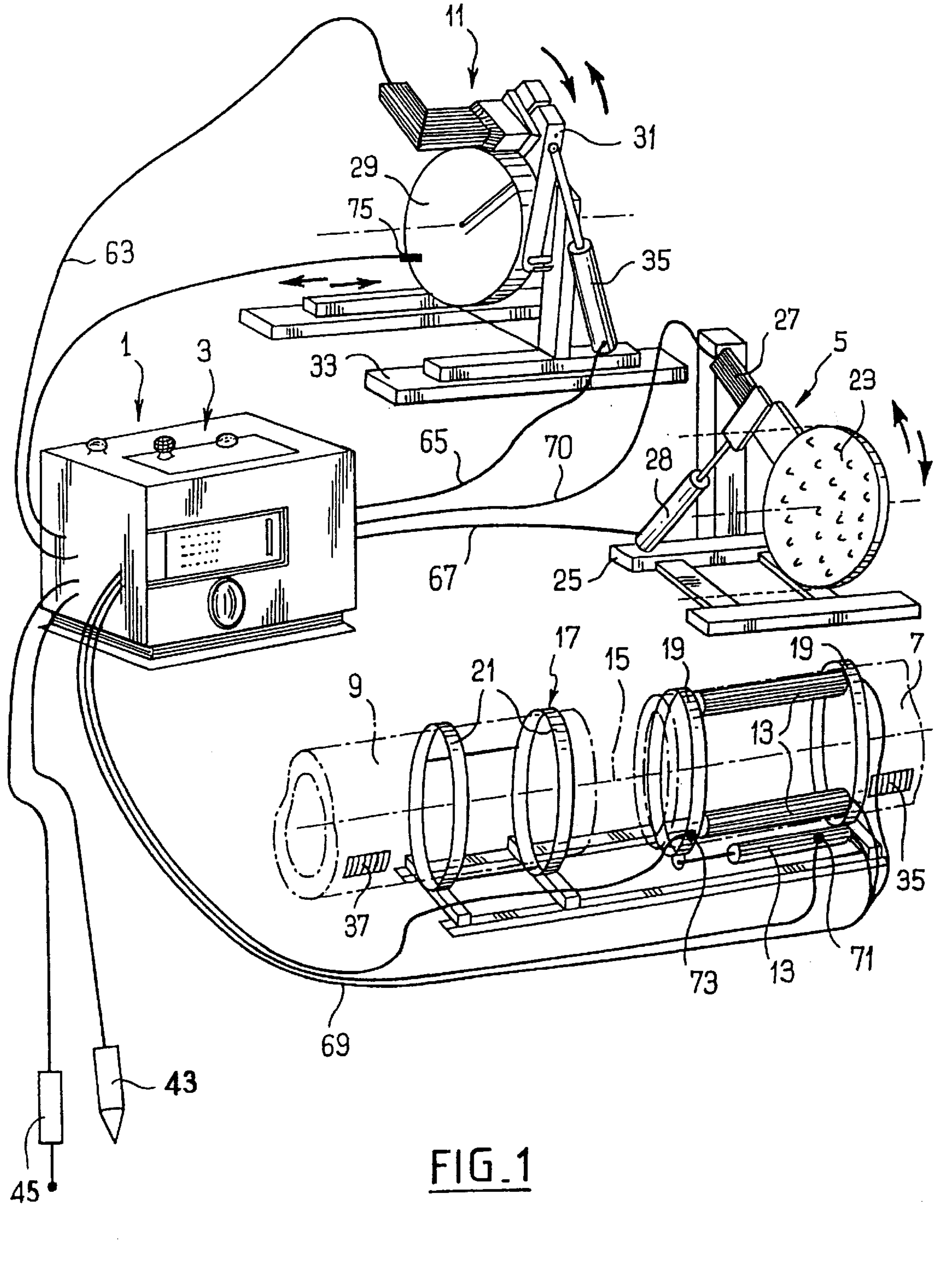
FIG. 1 is a diagrammatic perspective view of the principal elements constituting the welding apparatus.

In FIG. 1 it can be seen that the welding apparatus 1 illustrated comprises an automated control box 3 connected to a device 5 which will make it possible to rectify, before heating them, the ends of the two fusible plastics tubes 7, 9 to be butted, to a means 11 for heating these ends, and also to displacement means 13, such as hydraulic pressure cylinders, making it possible to translate the two parts 7, 9 axially, relative to each other, along their common axis 15.

In order to hold the parts 7, 9 in position, the latter have been mounted on a frame 17 comprising two groups of clamping jaws 19, 21. The jaws are connected to the pressure cylinders 13, thus making it possible to displace the tube 7 in translation relative to the tube 9, along the axis 15.

In place of the pressure cylinders 13, it would have been possible to use an electrical or mechanical displacement system for greater accuracy of displacement and monitoring of the latter.

Concerning the finishing device 5, this comprises a scraper head 23 articulated on a frame 25 at the end of an arm 27 moved by a pressure cylinder 28 (or equivalent), so as to be able to rectify the butting ends 7*a*, 9*a* of the parts facing each other, before heating them (see FIGS. 3 and 4).

With regard to the heating device 11, this may comprise an electrically and thermally conductive heating mirror 29 supplied with electrical energy so as to be able to be brought to a temperature capable of softening (fusion) the ends 7*a*, 9*a* of the parts when it is interposed between them, and placed in contact with them. The mirror 29 is borne by an arm 31 supported by a frame 33 and capable of pivoting under the control of a pressure cylinder (or equivalent) 35. The frame 33 is arranged to move parallel to the axis 15, to allow contact, under the required pressure, between the mirror 29 and each element 7, 9 (FIG. 5).

Such means are known per se ("WIDOS" machines, Patent EP-A-196 795, or publication "Kunstoff en Rubber", volume 43, No. 10, October 1990; pages 59–61).

The two parts 7, 9 to be welded are in the present case two tubes made of polyethylene. But they could be other parts, provided that their two ends 7*a*, 9*a* have compatible geometries (see in particular standard ISO/4437, ISO/4427 and ISO/DIS/8085-2).

Each part 7, 9 comprises an identification card or information support 37, 39, in the present case a bar code (but it could be a magnetic track or an electronic chip, for example).

FIG. 2 illustrates an example of an identification card (support 37).

For any details concerning this card, reference will be made to EP-A-0 643 642.

The interpretation of the code in FIG. 2 is as follows:

- the first four digits 1 to 4 (under the heading "manufacturer") make it possible to codify the manufacturer's references.

In the present case, the manufacturer "XX" has the reference 5626.

Moreover, the fact that the first figure is "5" indicates that it is a code relating to a butt welding process.

The following two digits ("type") indicate the nature of the part in question (tube: code 01, wrapped tube: code 02, branch socket: code 05, . . . ).

The following three digits (7, 8, 9) relate to the diameter. In the present case, this is the outside diameter of a tube (diameter at its end to be welded).

The code 224, associated with the "type" code "01", indicates here that it is a tube having an outside diameter of 63 mm.

The following six digits (10 to 15) refer to the batch number, as defined by the manufacturer. This makes it possible to identify the origin of the parts and in particular their date of manufacture; in the present case No. of the batch 11111.

The following digit (16th) relates to the "SDR" (Standard Diameter Ratio) coding.

For example, the code 0 indicates an "SDR">33, the code 1, an "SDR"=33, the code 2 an "SDR"=26, . . . , the code 7 an "SDR"=11, the code 8 an "SDR"=9 and the code 9 an "SDR"<9.

The following three digits (17, 18, 19) relate to the material of which the part in question is composed, in relation here to the table D-II of page 13 of the document ISO/138/SC4 "Fusion equipment" N 192).

Taking into account the code "021", it will be considered that this is a plastics material from "BP CHEMICALS", "Rigidex SC/02-40".

The following digit (20) makes it possible to define the "MRS" (Melt Resin Standard) of the part associated with the bar code.

Thus, the code "1" corresponds to an "MRS" of 63 (for polyethylene: PE), the code 2 to an "MRS" of PE/80 and the code 3 to an "MRS" of PE/100. In the present case, the code 2 has been used.

The 21st digit makes it possible to define the "MFI" of the part (MFI: Melt Flow Index).

For example, the code "0" corresponds to an "MFI" of from 0 to 0.3, the code 1, of more than 0.3 to 0.5, the code 2 from more than 0.5 to 0.7, the code 3 from more than 0.7 to 1, the code 4 from more than 1 to 1.5.

The digits 22, 23 and 24 themselves make it possible to define whether there can be compatibility between the part with which the code is associated and another part.

By definition, a part will be defined as compatible with another part if the two parts have the same physical dimensional characteristics, but also the same "MRS". The aspect of compatibility "MFI" appertains to the national or local standards.

The definition of this compatibility is provided here by means of the expression of the compatible "MRS" (digit 22) within a range of "MFI" (digit 23).

Thus, in the example of FIG. 2, the code "21" indicates a compatibility with a PE part having an "MRS" of 80 (code 2) if its "MF" is between more than 0.3 and 0.5 (code 1).

The codes "00" would indicate that there is no possible compatibility.

The following digits 24, 25, 26 and 27 themselves make it possible to define the batch number of the material (in the example 1234).

Concerning the digit 28, this makes it possible to define the correction of the time for the creation of the double bead B1.

A code "X" here indicates a correction of "0.X%" of the time for creation of the bead by 0° C. of deviation from the predefined nominal temperature of 20° C., for temperatures lower or higher than 20° C.

In the present case, the code "1" therefore indicates a correction of 0.1% of this time for creation of the bead.

The digits 29, 30 and 31 finally make it possible to define the meterage/length of the part. For example, the tube 7 is at "Y" m" with respect to the start of production. This element additionally permits differentiation in order to avoid self-compatibility by reading a single code.

In the example presented, the code "012" indicates a meterage of 0.12 (Y=0.12). No code of another identification card is supposed to have the same meterage.

To finish, the 32nd and final digit is a test digit.

A principle of coding of the cards 37, 39 associated with the parts 7 and 9 having been described, a description will now be given of the structure of the equipment 3 and especially of its processing unit 4.

It firstly comprises an A/D (analog/digital) converter 41 which converts and decodes the data supplied by a means 43 for reading the identification cards 37, 39, such as an optical pen or more generally a scanner.

To the converter 41 there is also connected a temperature probe 45 and also a sensor 71 for pressure or electrical energy (voltage, intensity) supplied to the displacement means 13, a sensor 73 for sensing the displacement (or stroke) of the support 19 for the parts, and a sensor 75 for the temperature of the "mirror" 29, which will be referred to again later.

After the reading pen 43 has made it possible to record the data contained and organised in the cards 37 and 39, as indicated above, these digitised data are transmitted by the converter 41 to a comparison unit 47, following the operation of a button for starting up the operation of the apparatus, 49 (start/stop button).

The function of the comparison unit 47 is to compare the physicochemical data of the codes and to verify in particular whether they correspond to compatible parts, ready to be welded together. In particular, the test of the comparison unit applies to the digits 20 to 27 corresponding to the "MRS" and "MFI" characteristics entered in each card, including the compatibilities provided for (FIG. 2).

It should be noted that the comparison additionally applies to the digits 7, 8 and 9 (diameters) which should be equivalent for the two parts, likewise for the "SDR" (digit 16) and for the correction datum (correction coefficient) of the 28th digit.

If the procedure of the tests of the two codes shown diagrammatically at 51 (FIG. 3) reveals an incompatibility, then an error signal is transmitted to a display means 54, as a signal preventing welding. If, on the other hand, no incompatibility is revealed, then a signal authorising welding is transmitted in the direction of the computer (or processing means with processor) 55 which has already been actuated by the tripping of the switch 49.

The computer 55 (which) may be constituted by a printed circuit connected to internal memory means shown diagrammatically at 57. These may be an EPROM and a RAM memory.

In the permanent memory (ROM or EPROM) of (or connected to) the computer, there have previously been entered, by programming, data relating to a welding rule or to a welding procedure to be observed, making it possible to initiate stages of butt welding especially according to a predefined standard, and also welding specifications appertaining to the following parameters: pressure(s), voltage(s), intensity(ies), temperature(s), stroke(s) (that is to say, data for relative displacement of the parts 7, 9, of movement(s)

of the heating element 11, or even of the finishing apparatus 5), time(s) (in particular duration data for staggering, or even delaying, over time the different operations to be carried out in order to obtain the desired weld, in particular according to a standard, such as ISO or DVS) and/or temperature(s) (such as the temperature which the heating element 29 should reach and the nominal desired temperature 0N which corresponds to a predetermined "mean" ambient temperature starting from which the correction of certain welding data will be able to be carried out, taking into account the actual ambient temperature which will have been measured by the probe 45.

It will be understood that it is difficult to define here in a definite and exhaustive manner the welding data which will have to be taken into account in the apparatus 1, taking account of the fact that these data may fluctuate according to the welding rules used, the standards which correspond to them also evolving periodically.

However, let an example be given on the basis of standard ISO/TC138/SC5/GT12 (document No. 191) of August 1992.

In this case, it is a question of defining the conditions for butt welding two rectilinear polyethylene tubes.

This document indicates in particular that welding should take place in six phases, as follows (after finishing of the faces 7*a,* 9*a* by the planer 5; FIG. 3):

Phase 1: heating

The pressure P1 during the heating phase is the pressure expressed in N/mm2 (MPa), applied in the area of contact (FIG. 5: approach stroke c).

The value of the bead B1 is the dimension of the bead, expressed in mm., to be obtained at the end of phase 1 of the welding cycle (FIG. 5).

The heating time t1 (first time interval) is the time, expressed in seconds, necessary to obtain in the assembly area during phase 1 of the welding a bead B1.

Phase 2: internal heating

The pressure P2 during the internal heating phase is the pressure expressed in N/mm2 applied in the contact area.

The duration of internal heating t2 (second time interval) is expressed in seconds.

Phase 3: withdrawal of the mirror

The time t3 (third time interval) is the time expressed in seconds between the moment when the two contact faces are detached from the mirror and the moment when they are brought into contact with each other.

Phase 4: increase in pressure (FIG. 7; approach stroke c')

The time t4 (fourth time interval) is the time, expressed in seconds, necessary for establishing the welding pressure.

Phase 5: welding

The welding pressure P5 is the pressure, expressed in N/mm2, applied in the contact area during phase 5.

The welding time t5 (fifth time interval) is the time expressed in minutes during which the assembly should remain under the welding pressure in the machine.

Phase 6: cooling

The cooling time t6 (sixth time interval) is the time expressed in minutes during which the weld is maintained during phase 6 without manipulation.

The value of the bead B2 is the dimension of the bead, expressed in mm., obtained at the end of phase 6 (FIG. 7).

The document additionally indicates certain conditions for producing the assembly according to the tube standard, with regard to the manner of fixing the tubes to the welding machine, to the finishing of their faces 7*a,* 9*a* and to the conditions determined below in tables A and B, and also in FIG. 9 which indicates the evolution of the "pressure" parameter according to the "time" parameter, during the six phases of the welding cycle.

The starting hypothesis for the two tables is as follows: two tubes made of high density polyethylene (HDPE), having as flow index a strict selected value: MFI5=0.45 (the index "5" indicating that the customary test has been carried out with a weight of 5 kg, the density per unit mass of the resin being 946 kg/m3 at 20° C., reference temperature) are to be butt welded.

TABLE A

| PARAMETERS | | UNIT | VALUE |
|---|---|---|---|
| Temp. of mirror (σ) | | ° C. | |
| 63 ≦ de ≦ 250 | | | (210 ± 15° C.) |
| 250 < de | | | (225 ± 10° C.) |
| PHASE 1 | Pressure P1 | N/mm2 (Mpa) | 0,18 + 0,02 |
| | Time t1 | s | to obtaining B1 |
| | Bead B1 | mm | de ≦ 180 :1 < B1 ≦ 2 |
| | | | 180 < de ≦ 315 :2 < B1 ≦ 3 |
| | | | 315 < de :3 < B1 ≦ 4 |
| PHASE 2 | Pressure P2 | N/mm2 (MPa) | 0.03 ± 0.02 |
| | Time t2 | s | 30 + de/2 ± 10 |
| PHASE 3 | Time t3 | s | max:3 + 0.01 de ≦ 8 |
| PHASE 4 | Time t4 | s | max:3 + 0.03 de ≦ 6 |
| PHASE 5 | Pressure P5 | N/mm2 (MPa) | 0.18 ± 0.02 |
| | Time t5 | mn | minimum: 10 |
| PHASE 6 | Time t6 | mn | min. 1.5 e and max. 20 |

TABLE B

| CONDITIONS | AMBIENT TEMPERATURE $\sigma_A$ (° C.) | MIRROR TEMPERATURE σ (29) | WELDING PRESSURE (N/mm2) |
|---|---|---|---|
| Minimum | +0 | | |
| | $\sigma_m$ − 5 − 2 | 205 ± 5 | 0.15 ± 0.02 |
| Maximum | $\sigma_M$ 40 ± 2 | 230 ± 5 | 0.21 ± 0.02 |

In these tables:

P: welding pressure applied to the face in question (7*a,* 9*a*) of the parts to be welded, t: time of each phase of the welding cycle, e: nominal thickness of the part (tube in the present case), de: nominal outside diameter of the tube, $\sigma_M$: maximum ambient temperature.

$\sigma_m$: minimum ambient temperature.

The "mirror" is the heating element 29.

The ambient temperature is the temperature at which assembly is carried out in practice. This temperature is measured by the probe 45 ($\sigma_A$).

The machine will go to "error" (stopping the welding cycle) if this ambient temperature measured is not between $\sigma_M$ and $\sigma_m$.

For any complementary information concerning these specific data, reference may be made to the description contained on pages 7, 8 and 9 of Patent EP 0 643 642, the contents of which are introduced into the present application by reference.

It should be clear that the procedure mentioned above with reference to this standard, like the parameters and their quantitative values, may be translated into desired "operating" data, starting from which the welding machine will work and which, for this purpose, will be entered in the internal memory, some of them, however, being able to be entered in the identification cards 37, 39, if such cards have been provided.

By way of example, these "operating data" may belong to the following list:

- approach stroke (C) of the movable part 7, assumed then to be distanced in the rear sliding position, and/or pressure of the pressure cylinders 13, P'1 then if necessary P'2, so as to displace this part until there are obtained successively the said pressures P1 during the time t1, then P2 during the time t2, in the area of contact of the parts, with the production of the double bead B1,
- energy to be delivered to the heating means 29, by way of the power stage 59 to produce B1 (it should be noted that this energy may be defined by a power (voltage and/or intensity) and by a time t'1 during which this power will be delivered),
- rear displacement stroke of the part 7, at the end of the time t2, (this stroke may be not stored in memory, since it corresponds to the opposite of C).
- during all or part of the time t3, then of the durations t4 and/or t5, relative approach stroke of the two parts and/or pressure(s) P'5, . . . of the pressure cylinders 13, in order to weld the parts to each other, in such a way as to obtain the pressures required by the standard (in particular P5), or even a value of the double bead B2 (see FIG. 7) which is the dimension of this bead, expressed in millimeters, obtained at the end of phase 6).

It should also be clear that as a complement to (or in place of) such pressure data (P'1, . . . , P'5, . . . ) to be transmitted to the pressure cylinders 13 in order to effect the relative translation of the parts, electrical data (voltage, current intensity, power, . . . ) could be used, on the assumption that, in place of hydraulic displacement means (pressure cylinders), electrical displacement means would be used (for example by way of a multiturn or linear potentiometer) or electro-hydraulic means, or others.

In the foregoing, it has been indicated that the ambient temperature at the moment of welding, measured by the temperature probe 45, may be used to correct the time for creation of the beads B1 and/or B2, or even the end of the heat diffusion time during t2.

Advantageously, this time "to be corrected" will correspond essentially to all or part of the durations t1, t2 and/or t4, t5, the durations t3 and t6 preferably not being concerned.

It should be noted that this "adaptation of time" according to the ambient temperature will apply principally or exclusively to the duration of diffusion of the heat applied by 29 in the ends 7a, 9a of the parts, during t1 and/or t2.

But it should be clear that as a substitute for, or as a complement to, this time correction, it is possible to correct (still according to this ambient temperature measured) the parameter "pressure" in the area of welding of the parts and/or the parameter "stroke" of these parts relative to each other (or even the parameter "electrical energy or power" to be supplied to the electrical means for replacing the pressure cylinders 13).

If the correction is applied to the "time" parameter, the following formula (D) may be used:

(D): $tR = tN(1+X)$ with $X = \Delta\sigma \times K$ and $\Delta\sigma = \sigma_N - \sigma_A$ tR representing the actual time corrected according to the ambient temperature $\sigma_A$ $\sigma_A$ = ambient temperature in the environment of the parts, at the moment of welding and measured by the probe 45, tN = nominal reference or desired time, $\sigma_N$ = nominal reference temperature (assumed to be 23° C. or 20° C. in general), $\Delta\sigma$ = temperature difference (positive or negative, depending on whether the ambient temperature measured by the probe is lower or higher than the reference temperature), K = correction coefficient Concerning this correction coefficient, it should be noted that in relation to the foregoing description, this may be the 28th character coded in the supports 37 and/or 39 (it will be recalled that in the example, a code "1" corresponded to a correction of 0.1% of the time t1 for creation of the beads B1 per °C. of deviation with an ambient temperature assumed to be 20° C., for temperatures lower or higher than the latter).

With regard to the nominal time (tN), it will in practice advantageously depend on at least one frontal dimension of the parts to be welded (diameter, thickness, . . . ) and on the welding rule to be applied (standard), or even on the material of the parts.

Taking into account the foregoing, it will also have been understood that if the correction were to apply to the parameter "pressure", "electrical energy or power" (U, I, P, . . . ), or "stroke", the reference would be given with respect to a nominal pressure or a nominal stroke, advantageously with a correction to the pressures or strokes established during the times t1, t2, t4 and/or t5, and still more advantageously, during the time for diffusion of the heat (applied by 29) in the ends 7a, 9a, during the production of the beads B1, (that is to say, while there is contact between the parts and the heating mirror).

Particularly concerning the parameter "stroke" (relative displacement of the two parts 7,9 with respect to each other), it will also be noted that its use will satisfy all or part of the following functions:

- monitoring of the evolution of the "welding pressure" parameter according to the "time" parameter (FIG. 9),
- monitoring of the relative position of the parts being welded,
- monitoring of the beads of material (B1 and/or B2, with nevertheless a preference for B1, since one of the interests of taking into account the ambient temperature is to be able to adapt the time for diffusion in the material of the heat supplied by the element 29, according to this ambient temperature).

Figure 9:
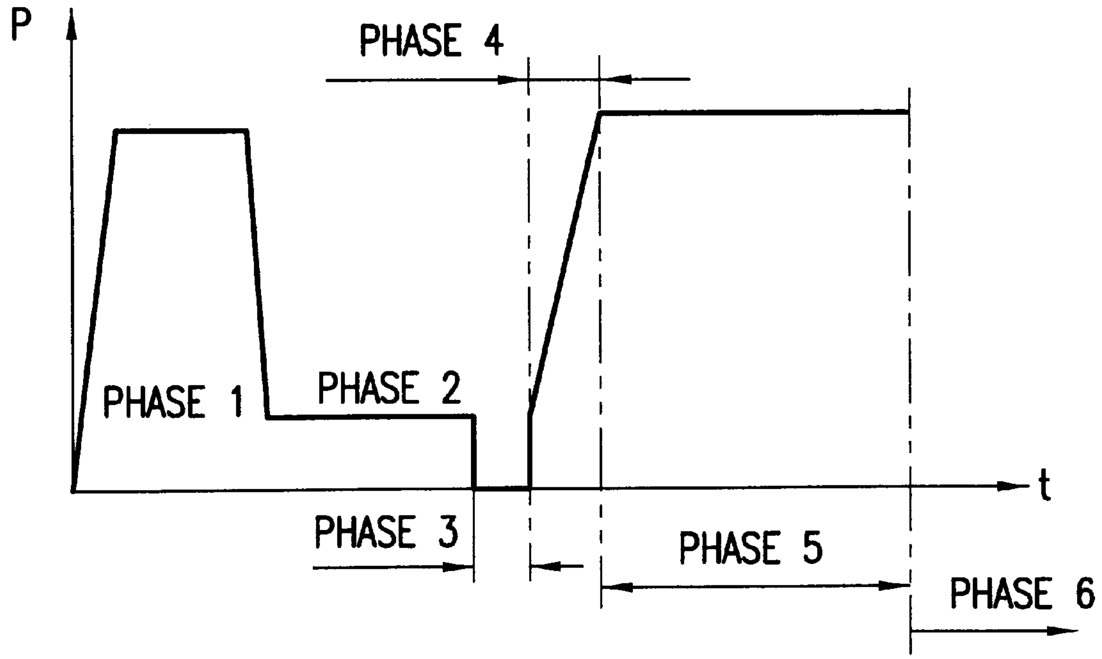
FIG. 9 shows the evolution, for butt-welding, of the parameter "pressure" in the area of welding (P) with respect to the time (t).

In order to satisfy the monitoring of the evolution of the parameter "pressure in the welding area" as a function of the time, for example as in FIG. 9 according to the corresponding standard, it is proposed to record in the internal memory 57 a nomogram corresponding, point by point, to the evolution over time of the relative displacement of the parts at least during the times indicated immediately above, corresponding to the pressure/time evolution illustrated in FIG. 9.

It should further be noted that this nomogram could however be established by taking into account a correction coefficient according to the ambient temperature measured by the probe 45, so that there is thus obtained a correction of the strokes or displacements monitored over time of the parts with respect to each other, according to this ambient temperature.

Figure 8:
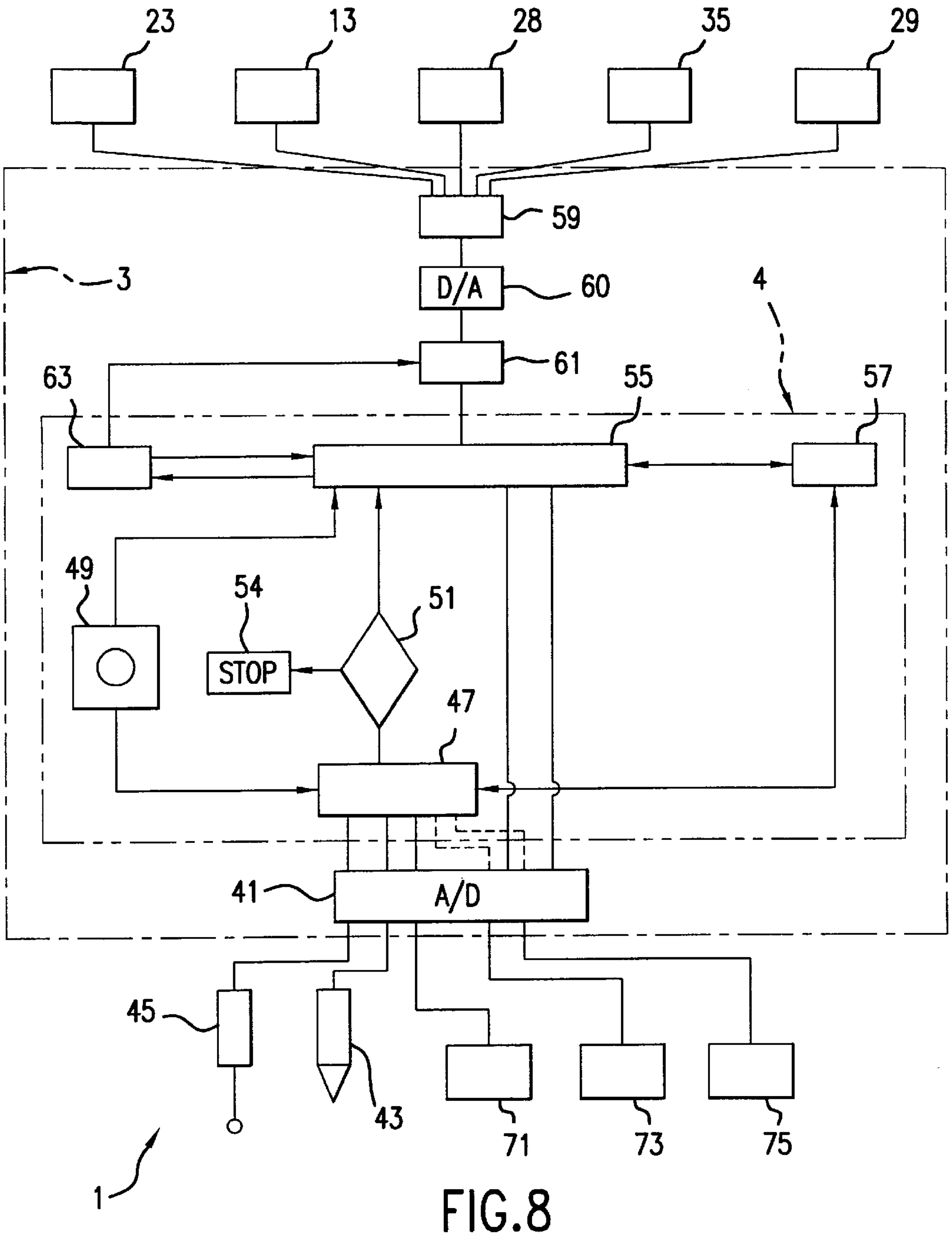
FIG. 8 shows an electronic wiring diagram of the control box of the apparatus.

In order to provide the required time delay, a clock unit has been provided (see FIG. 8).

The clock unit 63 is connected to the computer 55, to the control monitor 61 which is itself connected to the power stage 59, by way of the D/A converter 60.

This power stage 59 consists of a unit for supplying energy which may be electrical, hydraulic, electro-hydraulic, . . .

In the present case, the power stage 59 in question (partly electrical supply unit, partly hydraulic supply unit), comprises four outlets 63, 65, 67, 69, respectively connected to the heating means of the mirror 29 (resistance), to the pressure cylinder 35 of the mirror, to the pressure cylinder 28 for articulation of the finishing device 5 and to the pressure cylinders 13 for displacement of the movable structure carrying the tube 7.

Each control will therefore be effected through the digital/analog (D/A) converter 60, with the interposition of any necessary interface, depending on the source (electrical, hydraulic, . . . ) required.

It should be noted that if "pressure" and/or "stroke" corrections are to be made, then the converter 41 will be connected, at the input, to at least one pressure sensor 71 for the pressure cylinders 13 and a stroke sensor 73 capable of measuring and transmitting all or part of the displacement strokes in relative translation of the two parts 7, 9 starting from a preset calibration. The computer 55 will then take into account these data in order to satisfy the requirements of the welding rule (standard) to be observed (pressure values, in particular, or height of beads, . . . ).

If a stroke sensor 73 is provided, its use may advantageously be associated with a calculation algorithm entered in the memory 57 in order to effect, by way of the computer 55, a correction of the stroke (C and/or C') of the parts (FIGS. 5 and 7), according to a pre-set desired stroke previously entered in the memory 57. Thus, at least some of the welding parameters fixed by the "standard" to be observed will be controlled by acting on the stroke of the parts, by comparison between the "reference" stroke stored in the memory and that actually measured by the sensor 73.

A sensor 75 for the temperature of the mirror 29 may also be connected to the converter 41, its data being able to pass through the comparator 47 in order to verify that the temperature is in fact between $\sigma_M$ and $\sigma_m$ entered in the memory 57 (see table B), in default of which, there will be an interruption in the welding (by way of 51).

Of course, if the hydraulic means 13 for relative displacement of the parts are replaced by another mechanical means, or preferably electrical means (for example an electric motor with potentiometer), the pressure sensor 71 will be replaced by a mechanical sensor or a voltage or intensity sensor.

Moreover, if instead of wishing to effect, as an alternative or as a complement, corrections made on the basis of the measurements of the stroke sensor 73 and/or pressure sensor 71, it is preferred to confirm the data of one of the sensors by means of the data of the other, then it is possible to couple the connections of these two sensors by way of the comparator 47 (dash/dotted lines in FIG. 8) making it possible to obtain adequation between the pressure data and the displacement data, by way of the computer 55 which will, if necessary, send correction data to the displacement means 13.

In order to explain the influence of the different sensors mentioned, let it be assumed that it is desired to correct the time t1 for initiation of the beads B1 according to the ambient temperature (the same reasoning being able to be followed if it is desired to correct the "pressure" parameter and/or the parameter "stroke" of relative displacement of the parts).

In order to obtain the supposed correction to the "time" parameter, the temperature probe 45 will be used to measure the actual temperature on or in the environment of the parts on site.

Let it be assumed that this actual ambient temperature is 15° C.

This datum, measured by the probe, is supplied to the computer 55, through the converter 41 and the line 73.

In the memory 57 there have already been entered the data read by the reading means 43, so that the computer has already taken into account the fact that, on each of the codes 37 and 39, there is provided a correction (K), for example of "0.1%" of the time for creation of the said beads B1 per 0° C. of deviation with the predefined nominal temperature ($\sigma_N$=20° C.).

Thus, in the example, a correction appropriate to the 15° C. of ambient temperature measured will be applied by the computer and the actual corresponding duration tR of the time will be supplied to the pressure cylinders 13, in order to obtain the bead starts B1 in FIG. 6, according to the requirements of the standard.

Naturally, the above-mentioned formula (D):

tR=tN(1+X) may be used for that, therefore with, in the present case, $\sigma_N$=20° C., $\sigma_A$=15° C., $\Delta\sigma$=+5° C. or, if K=0.1% (per °C. of deviation with respect to 20° C.), X=+5(0.5%)=+2.5%; so tR=tN(1.025), in °C.

The desired datum tN will have been entered in the memory 57.

Thus, if the nominal reference temperature ($\sigma_N$) is higher than the temperature measured by the probe 45 at the moment of welding ($\sigma_A$), the time for obtaining the beads in question will be extended; if, on the other hand, $\sigma_A$ is lower than $\sigma_N$, the time for obtaining them will be shortened.

We claim:

1. Process for automatically butt-welding parts made of plastics material(s), wherein:

the parts are arranged with their ends to be welded face to face, the ends of the parts are heated by way of a heating element, then the heating produced is allowed to diffuse therein internally for a total heating time (t1) then an internal heating (t2), under a pressure (P1, P'1) during the heating time and a pressure (P2, P'2) during the internal heating time, in order to obtain there beads of material (B1), following a substantially coaxial stroke (C) of relative displacement of the parts, by way of displacement means, then, on expiry of a transition time interval (t3), the said ends of the parts are applied to one another, by their beads of material (B1), following another relative stroke (C'), by way of the said displacement means, for a duration (t4) necessary to establish a welding pressure (P5, P'5), followed by a time (t5) for substantial maintaining of the said welding pressure, after which, the weld obtained is maintained substantially without manipulation for a cooling time interval (t6), characterized in that, depending on the ambient temperature (0A) measured in the environment of the parts at the moment of welding, at least one of the following parameters is corrected:

pressure(s) (P1, P'1), and/or (P2, P'2), and/or (P5, P'5), electrical energy to be supplied to the said means for displacement of the parts (voltage, current intensity . . . ), stroke(s) of relative displacement of the parts, (C) and/or (C').

2. Process according to claim 1, wherein:

the ambient temperature is measured by means of a temperature probe, the corresponding temperature readings are supplied to a processing unit of a control box which determines the adapted value of the electrical energy, pressure and/or stroke in question, according to a correction algorithm previously entered in an internal memory of the box, to a correction coefficient (K) also previously entered in the internal memory of the said box, and to a nominal reference or desired pressure, electrical power (U, I, . . . ) and/or stroke.

3. Process according to claim 1, wherein:

the ambient temperature (0A) is measured by means of a temperature probe, the (each) part to be welded is equipped with an external support designed to contain data concerning the welding of the said parts and capable of being read by reading means suitable for the transmission of these data to the processing unit of a control box, the ambient temperatures measured by the probe and the said data read on the (each) support are fed to the said processing unit which determines the adapted value of the pressure, electrical energy (U, I, . . . ) and/or stroke in question according to a calculating algorithm, a correction coefficient and a nominal reference pressure, electrical energy and/or stroke.

4. Process according to claim 1, wherein pressure values in the area of welding of the parts and/or bead values in this area are satisfied according to a welding rule to be observed, using monitoring of the stroke of relative displacement of the said parts, according to a pre-set reference stroke and an actual stroke measured during the course of welding.

5. Process according to claim 4, wherein, in order to pre-set the reference stroke, there are recorded on a memory support data relating to the evolution over time of the displacement of the said parts during at least part of the welding procedure, according to data relating to the evolution over time of the parameter "pressure" in the area of welding of the parts according to the said welding rule to be observed.

6. Process according to claim 1, wherein the relative displacement of the said parts over time is corrected according t the ambient temperature measured at the moment of welding.

7. Apparatus for heating, butted together, two plastics parts comprising:

a frame comprising two parts movable relative to each other to support the parts substantially coaxially with their ends face to face, a movable element for electric heating of the parts, designed to be arranged between the ends of the said parts, the element comprising electric heating means capable of being brought to a temperature sufficient to cause the said ends to melt, in order to weld them to each other, means for relative displacement of the said parts of the frame in order to bring the ends of the parts closer or further away with respect to each other or with respect to the heating element, a temperature probe for measuring an ambient temperature (0A) when welding is to be carried out and in order to transmit data according to this ambient temperature, a control box comprising:

memory means to contain data relating to a pre-set welding procedure and to values of predefined parameters concerning the welding, among data of: pressure (s), temperature(s), time(s), and/or stroke(s) of relative displacement of the parts, means for processing with processor communicating with the memory means and with the temperature probe, in order to transmit control signals according to the data received from the memory means and the temperature probe, a power unit communicating with the processing means in order to deliver a command to the heating element and the displacement means, according to the signals transmitted to the said power unit by the processing means, characterized in that:

the processing unit determines a correction of the data for pressure(s), stroke(s), and/or electrical energy delivered to the said means for relative displacement of the parts according to the ambient temperature measured by the said temperature probe.

8. Apparatus according to claim 7, wherein it comprises a sensor for sensing the displacement of the parts.

9. Apparatus according to claim 8, wherein:

the displacement sensor measures the actual stroke of the said parts during welding, and the memory means contain data of pre-set nominal reference stroke(s), so that the processing means feed to the means for displacement of the parts, control data corrected according to a deviation between the said nominal data and the actual data measured by the displacement sensor.

10. Apparatus according to claim 8, wherein the displacement sensor is coupled to a sensor for the energy (electrical, hydraulic) supplied to the said means for displacement of the parts by the power unit, in order to monitor the pressures to be observed according to the said pre-set welding procedure, by way of monitoring of the relative stroke of the parts.

11. Apparatus according to claim 7, wherein the said displacement means comprise an electrical displacement means.

12. Apparatus according to claim 7, wherein it additionally comprises:

an identification support connected to at least one of the said parts and designed to contain data concerning the welding of the parts, the data including data for correcting the time for obtaining beads (B1, B2) at the ends of the said parts, means for reading the data of the said support, in order to transmit the data to the said processing means in order to adapt the said time for obtaining the beads of material (B1, B2) according to the ambient temperature data measured by the temperature probe.

13. A process for automatically butt-welding parts made of plastic material(s), comprising the following steps of:

arranging the parts with their ends to be welded face to face, heating the ends of the parts by way of a heating element for a first time interval, and having the heat diffuse inside the parts for a second time interval, displacing, following a first stroke, the parts one towards the other by way of displacement means powered by electrical energy, and pressing said parts against the heating element for the first and second time intervals at respective heating pressures adapted for obtaining beads on the parts, while allowing the heating produced by the heating element to be diffuse inside the parts, on expiry of a third time interval, displacing, following a second stroke, the parts one towards the other by way of said displacement means, and pressing said parts one against the other by their beads of material at a welding pressure and a fourth time interval necessary to establish said welding pressure, maintaining said welding pressure against the parts during a fifth time interval, maintaining the weld obtained without manipulation for a sixth time interval correcting, depending on the ambient temperature measured in the environment of the parts, at the moment of welding, at least one of said first to sixth time interval and at least one of the following parameters:

pressure(s) applied to the parts, electrical energy to be supplied to the said means for displacement of the parts, stroke(s) of relative displacement of the parts one relative to the other.

14. Process according to claim 13, wherein the time (t1) for heating of the said parts and/or the time (t2) for internal heating of the latter is/are corrected according to the said ambient temperature measured at the moment of welding, to the exclusion of the other subsequent times.

* * * * *